US008892932B2

(12) United States Patent
Takahashi et al.

(10) Patent No.: US 8,892,932 B2
(45) Date of Patent: Nov. 18, 2014

(54) IMAGE FORMING APPARATUS AND CONTROL APPARATUS

(75) Inventors: Keita Takahashi, Abiko (JP); Atsushi Otani, Moriya (JP); Shoji Takeda, Tokyo (JP); Satoru Yamamoto, Abiko (JP); Hirotaka Seki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 654 days.

(21) Appl. No.: 13/041,713

(22) Filed: Mar. 7, 2011

(65) Prior Publication Data

US 2011/0225443 A1 Sep. 15, 2011

(30) Foreign Application Priority Data

Mar. 15, 2010 (JP) ................................. 2010-058298

(51) Int. Cl.
*G06F 1/12* (2006.01)
*G06F 1/04* (2006.01)
*G06F 13/42* (2006.01)
*G06F 11/00* (2006.01)
*H04L 7/00* (2006.01)

(52) U.S. Cl.
CPC ........................................ *G06F 1/04* (2013.01)
USPC ............ 713/400; 713/375; 713/503; 713/600

(58) Field of Classification Search
None
See application file for complete search history.

(56) References Cited

U.S. PATENT DOCUMENTS

| 4,964,141 | A | * | 10/1990 | Matsushima et al. | ......... | 375/354 |
|---|---|---|---|---|---|---|
| 4,984,190 | A | * | 1/1991 | Katori et al. | .................. | 709/237 |
| 5,043,809 | A | | 8/1991 | Shikakura et al. | | |
| 5,125,041 | A | | 6/1992 | Kimura et al. | | |
| 5,333,015 | A | | 7/1994 | Harigaya et al. | | |
| 5,493,418 | A | | 2/1996 | Takahashi et al. | | |
| 5,704,030 | A | * | 12/1997 | Kanzaki | .......................... | 714/12 |
| 6,292,741 | B1 | | 9/2001 | Bitzer et al. | | |
| 6,343,137 | B1 | | 1/2002 | Kimura et al. | | |
| 6,381,034 | B2 | | 4/2002 | Iwasaki et al. | | |
| 6,493,519 | B2 | | 12/2002 | Sasame et al. | | |
| 6,504,960 | B2 | | 1/2003 | Takahashi | | |
| 6,714,745 | B2 | | 3/2004 | Sasame et al. | | |

(Continued)

FOREIGN PATENT DOCUMENTS

| JP | 05-242154 A | 9/1993 |
|---|---|---|
| JP | 2000-071819 | 3/2000 |

(Continued)

*Primary Examiner* — Tanh Nguyen

(74) *Attorney, Agent, or Firm* — Fitzpatrick, Cella, Harper & Scinto

(57) ABSTRACT

The present image forming apparatus includes a first control unit and a second control unit driven by built-in clock oscillators to realize the distributed control. The first control unit generates, using a first timer driven by the built-in clock oscillator of the first control unit, a pulse signal corresponding to a predetermined clock rate and outputs the pulse signal to the second control unit. The second control unit measures, using a second timer driven by the built-in clock oscillator of the second control unit, a pulse width of the pulse signal outputted from the first control unit, and calculates a correction coefficient using reference pulse width corresponding to the predetermined clock rate and the measured pulse width. The processing unit processes using the calculated correction coefficient.

9 Claims, 13 Drawing Sheets

(56) References Cited

U.S. PATENT DOCUMENTS

| | | |
|---|---|---|
| 7,391,473 B2 | 6/2008 | Takahashi |
| 7,426,319 B2 | 9/2008 | Takahashi |
| 7,792,355 B2 | 9/2010 | Takahashi |
| 2002/0088003 A1* | 7/2002 | Salee ............................ 725/111 |
| 2004/0045037 A1* | 3/2004 | Cummings et al. ........... 725/129 |
| 2009/0185211 A1 | 7/2009 | Sunayama |
| 2011/0161717 A1 | 6/2011 | Nojiri |
| 2011/0225443 A1* | 9/2011 | Takahashi et al. ............ 713/503 |

FOREIGN PATENT DOCUMENTS

| | | |
|---|---|---|
| JP | 2000-078891 | 3/2000 |
| JP | 2001-119996 | 4/2001 |
| JP | 2006-171960 | 6/2006 |
| JP | 2006-215869 A | 8/2006 |
| JP | 2009-175267 A | 8/2009 |
| JP | 2011-150310 A | 8/2011 |

* cited by examiner

IMAGE FORMING APPARATUS AND CONTROL APPARATUS

BACKGROUND OF THE INVENTION

1. Field of the Invention

The present invention relates to an image forming apparatus and a control apparatus realized by a distributed control system.

2. Description of the Related Art

One CPU performs centralized control in printer device control of an image forming apparatus adopting an electrophotographic system. However, a higher-performance CPU is required as a result of an increase in the load of the CPU due to control-based centralization. Furthermore, communication cables (communication lines) need to be laid out to a control load driver unit distant from the CPU board along with the increase in the control load of the printer device, and a multiplicity of long, large communication cables are required. To solve the problems, a control format of dividing the control modules constituting the electrophotographic system into individual sub CPUs is drawing attention.

For example, Japanese Patent Laid-Open No. 2000-071819 proposes hierarchically disposing functional modules in a vehicle to perform distributed control, and Japanese Patent Laid-Open No. 2006-171960 proposes applying a similar hierarchical control structure to a robot/automation device. The plurality of sub CPUs include communication units that operate the entire system. Furthermore, in Japanese Patent Laid-Open No. 2006-171960, a control network for communications between functional modules establishes individual communication networks layer by layer. In this way, the establishment of a more stable control network by distributing the load is proposed.

To apply the proposed control network to the image forming apparatus, the increase in the cost caused by the distribution of the load needs to be minimized. Particularly, an effect of cost reduction by reducing the number of components on CPU circuit boards is large in the plurality of circuit boards mounted on one image forming apparatus. To realize this, a multiplicity of CPU vendors manufacture products including clock oscillators in the CPU, and systems using the products are also on the market.

However, there are the following problems in the built-in clock oscillators. For example, the built-in clock oscillators are less accurate compared to general clock oscillators, and there are individual differences in the built-in clock oscillators in the same type of CPUs. As a result, when a plurality of CPUs individually control actuators such as stepping motors, an error occurs in the speed between the stepping motors that control the conveyance of paper due to an error in the built-in clock oscillators, and mutual pulling of paper, flexures, etc., occur. Furthermore, time measurement results may be different between the CPUs in the measurement of a predetermined time. This causes a paper jam or a color deviation. Therefore, a system without the speed difference or the error in the time control between the CPUs is required in the image forming apparatus that realizes the distributed control.

Consequently, Japanese Patent Laid-Open No. 2000-078891 proposes a motor control apparatus that stores data related to a motor excitation signal sequence in a memory and that outputs the data in the memory to a control target motor as an excitation signal. Japanese Patent Laid-Open No. 2001-119996 proposes a motor acceleration/deceleration control method of a distributed control system that selects a solution of a linear operational expression from a deceleration time between an activation pulse speed and a motion pulse speed or selects an arithmetic method from the linear operational expression and that computes a pulse speed during acceleration/deceleration that is a next acceleration/deceleration process transition time. However, the control methods are for a single CPU, and an error between motor controls in a plurality of CPUs is not taken into consideration. For example, an error occurs in the speed between the stepping motors that control the conveyance of paper, and the error causes problems, such as mutual pulling of paper and flexures.

SUMMARY OF THE INVENTION

The present invention enables realization of an image forming apparatus and a control apparatus that adopt a distributed control system and the reduce influence of a control error between a plurality of control units.

One aspect of the present invention provides an image forming apparatus comprising: a first control unit driven by a first clock oscillator; and a second control unit driven by a second clock oscillator, the first control unit comprising a signal transmitting unit that generates, using a first timer driven by the first clock oscillator, a pulse signal in accordance with a predetermined clock rate, and that transmits the generated pulse signal to the second control unit, the second control unit comprising: a signal receiving unit that receives the pulse signal transmitted by the signal transmitting unit; a measurement unit that measures, using a second timer driven by the second clock oscillator, a pulse width of the pulse signal received by the signal receiving unit; a calculation unit that calculates a correction coefficient using reference pulse width corresponding to the predetermined clock rate and the measurement pulse width; and a processing unit that processes using the calculated correction coefficient.

Another aspect of the present invention provides a control apparatus comprising: a first control unit driven by a first clock oscillator; and a second control unit driven by a second clock oscillator, the first control unit comprising a signal transmitting unit that generates, using a first timer driven by the first clock oscillator, a pulse signal in accordance with a predetermined clock rate, and that transmits the generated pulse signal to the second control unit, the second control unit comprising: a signal receiving unit that receives the pulse signal transmitted by the signal transmitting unit; a measurement unit that measures, using a second timer driven by the second clock oscillator, a pulse width of the pulse signal received by the signal receiving unit; a calculation unit that calculates a correction coefficient using reference pulse width corresponding to the predetermined clock rate and the measurement pulse width; and a processing unit that processes using the calculated correction coefficient.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Present Embodiment

Configuration of Image Forming Apparatus

Figure 1:
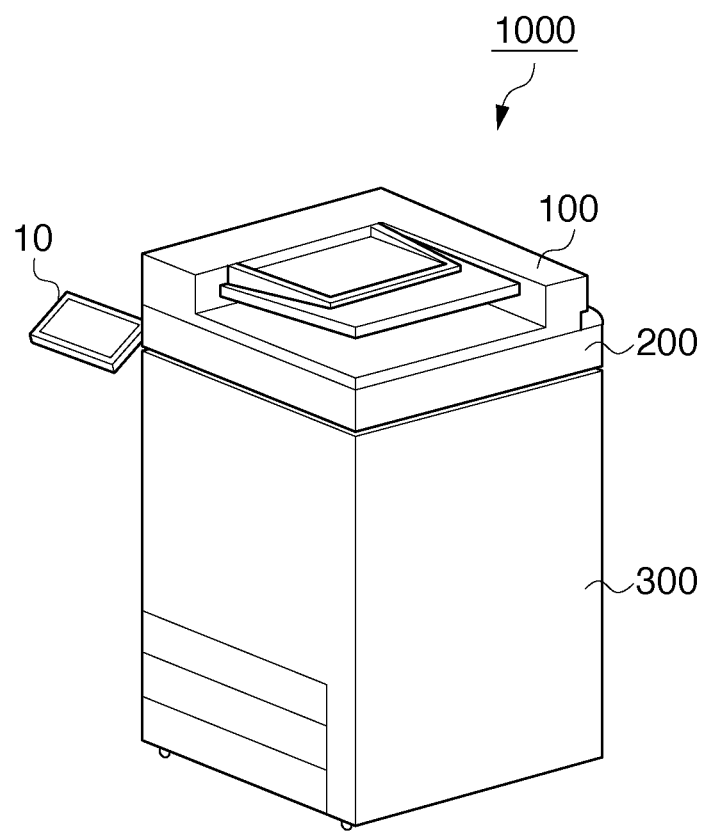
FIG. 1 is a diagram showing an overview of an image forming apparatus 1000 according to the present embodiment.

Hereinafter, an embodiment of the present invention will be described with reference to FIGS. 1 to 15. A configuration of an image forming apparatus 1000 according to the present embodiment will be described first with reference to FIG. 1. The image forming apparatus 1000 includes an automatic document conveyance apparatus 100, an image reading unit 200, an image forming unit 300, and an operation unit 10. As shown in FIG. 1, the image reading unit 200 is disposed on the image forming unit 300. The automatic document conveyance apparatus (DF) 100 is further disposed on the image reading unit 200. The present image forming apparatus 1000 uses a plurality of control units (CPUs) to realize distributed control. Configurations of the CPUs will be described later with reference to FIG. 3.

The automatic document conveyance apparatus 100 automatically conveys a document to a glass copy board. The image reading unit 200 reads the document conveyed from the automatic document conveyance apparatus 100 and outputs image data. The image forming unit 300 forms an image on a recording material (recording sheet) in accordance with the image data outputted from the automatic document conveyance apparatus 100 or image data inputted from an external apparatus connected through a network. The operation unit 10 includes a GUI (graphical user interface) for various operations by the user. The operation unit 10 further includes a display unit, such as a touch panel, and is capable of presenting information to the user.

<Image Forming Unit>

Details of the image forming unit 300 will be described with reference to FIG. 2. The image forming unit 300 of the present embodiment adopts an electrophotographic system. Reference characters Y, M, C, and K shown at the ends of reference numerals in FIG. 2 denote engines corresponding to yellow, magenta, cyan, and black toners, respectively. Hereinafter, the characters Y, M, C, and K at the ends are omitted to describe the reference numerals to indicate engines corresponding to all toners, and the characters Y, M, C, and K are attached at the ends of the reference numerals to indicate individual engines.

A photoreceptor drum (hereinafter, simply called "photoreceptor") 225 as an image carrier for forming a full-color electrostatic image is rotatable in a direction of an arrow A by a motor. A primary charging device 221, an aligner 218, a developing apparatus 223, a transferring apparatus 220, a cleaner apparatus 222, and an electricity removing apparatus 271 are disposed around the photoreceptor 225.

A developing apparatus 223K is a developing apparatus for monochrome development and develops a latent image on a photoreceptor 225K by a toner of K. Developing apparatuses 223 Y, M, and C are developing apparatuses for full-color development, and the developing apparatuses 223 Y, M, and C develop latent images on photoreceptors 225 Y, M, and C by toners of Y, M, and C, respectively. The transferring apparatus 220 collectively multiplexes and transfers the toner images of the colors developed on the photoreceptor 225 to a transfer belt 226 as an intermediate transfer body, and the toner images of four colors are overlaid.

The transfer belt 226 is stretched around rollers 227, 228, and 229. The roller 227 is coupled to a driving source to function as a driving roller that drives the transfer belt 226. The roller 228 functions as a tension roller that adjusts the tension of the transfer belt 226. The roller 229 functions as a backup roller of a transfer roller as a secondary transferring apparatus 231. A transfer roller detaching unit 250 is a driving unit that adheres and separates the secondary transferring apparatus 231 to and from the transfer belt 226. A cleaner blade 232 is arranged below the transfer belt 226 after the passage of the secondary transferring apparatus 231, and the blade scrapes off residual toners on the transfer belt 226.

A registration roller 255, a pair of paper feed rollers 235, and pairs of vertical path rollers 236 and 237 feed the recording material (recording sheet) stored in cassettes 240, 241, and a manual paper feed unit 253 to a nip portion, which is an abutment between the secondary transferring apparatus 231 and the transfer belt 226. The transfer roller detaching unit 250 causes the secondary transferring apparatus 231 to contact the transfer belt 226. The nip portion transfers the toner image formed on the transfer belt 226 to the recording material. A fixing apparatus 234 thermally fixes the toner image on the recording material with the transferred toner image, and the toner image is discharged outside the apparatus.

The cassettes 240, 241, and the manual paper feed unit 253 include no-sheet detection sensors 243, 244, and 245, respectively, that detect the presence of the recording material. The cassettes 240, 241, and the manual paper feed unit 253 also include paper feeding sensors 247, 248, and 249, respectively, that detect a pickup failure of the recording material.

An image forming operation by the image forming unit 300 will be described. When image formation is started, pickup rollers 238, 239, and 254 convey the recording material stored in the cassettes 240, 241, and the manual paper feed unit 253 to the pair of paper feed rollers 235 piece by piece. When the pair of paper feed rollers 235 convey the recording material to the registration roller 255, a registration sensor 256 immediately before the registration roller 255 detects the passage of the recording material.

When the registration sensor 256 detects the passage of the recording material, the conveyance operation is temporarily suspended in the present embodiment after a predetermined time. As a result, the recording material hits the terminated registration roller 255, and the conveyance is terminated. The conveyance position is fixed so that the end in the travelling direction of the recording material is perpendicular to the conveyance path, and a skew, in which the conveyance direction of the recording material is displaced relative to the conveyance path, is corrected. Hereinafter, the process will be called a positional correction. The positional correction is required to minimize the subsequent inclination in the image formation direction relative to the recording material. After the positional correction, the registration roller 255 is activated to supply the recording material to the secondary transferring apparatus 231. The registration roller 255 is coupled to a driving source, and a clutch transmits the drive to rotate and drive the registration roller 255.

A voltage is applied to the primary charging device 221 to uniformly and negatively charge the surface of the photoreceptor 225 at a planned charge section potential. The aligner 218 including a laser scanner unit then exposes the image so that the image part on the charged photoreceptor 225 has a predetermined exposure section potential, and a latent image is formed. The aligner 218 forms the latent image corresponding to the image by turning on/off the laser light based on the image data transmitted by a controller 460 through a printer control I/F 215.

A development bias preset for each color is applied to a development roller of the developing apparatus 223. The toners develop the latent image when the image passes through the position of the development roller, and the latent image is visualized as a toner image. The transferring apparatus 220 transfers the toner image to the transfer belt 226. The secondary transferring apparatus 231 further transfers the toner image to the recording material conveyed by a paper feed unit. The toner image then passes through a post-registration conveyance path 268 and is conveyed to the fixing apparatus 234 through a fixed conveyance belt 230.

In the fixing apparatus 234, chargers before fixation 251 and 252 charge the toner image to reinforce the attraction force of the toners to prevent an irregular image. A fixing roller 233 thermally fixes the toner image. A discharge flapper 257 switches the conveyance path toward a discharge path 258, and a discharge roller 270 discharges the recording material to a discharge tray 242.

A cleaner apparatus 222 removes and collects the toner remaining on the photoreceptor 225. Lastly, the electricity removing apparatus 271 uniformly removes the electricity of the photoreceptor 225 to near 0 volts to prepare for the next image formation cycle.

As for the start timing of the color image formation by the image forming apparatus 1000, the image can be formed at an arbitrary position on the transfer belt 226 because of the Y, M, C, K simultaneous transfer. However, the image formation start timing needs to be determined while shifting the timing in accordance with the differences in the positions for transferring the toner images on the photoreceptors 225Y, 225M, and 225C.

In the image forming unit 300, the cassettes 240, 241, and the manual paper feed unit 253 can continuously feed the recording material. In that case, in consideration of the sheet length of the preceding recording material, the cassettes 240, 241, and the manual paper feed unit 253 feed the paper at the shortest intervals so that the recording materials do not overlap. As described, the registration roller 255 is activated after the positional correction to supply the recording material to the secondary transferring apparatus 231. However, the registration roller 255 is temporarily terminated again when the recording material reaches the secondary transferring apparatus 231. This is to correct the position of the following recording material just like the positional change of the preceding recording material.

An operation of forming an image on the back side of the recording material will be described in detail. Before the formation of the image on the back side of the recording material, the image is first formed on the front side of the recording material. In the image formation of only the front side, the fixing apparatus 234 thermally fixes the toner image, and the image is discharged to the discharge tray 242. Meanwhile, in the case of continuous image formation on the back side, the discharge flapper 257 switches the conveyance path toward a backside path 259 when a sensor 269 detects the recording material. A two-side reverse path 261 conveys the recording material by rotational drive of an associated reverse roller 260. The recording material is then conveyed to the two-side reverse path 261 by the amount of the feeding direction width, and the travelling direction is switched by reverse rotational driving of the reverse roller 260. The recording material is conveyed to a two-side path 263 by the driving of a two-side path conveyance roller 262, with the image surface formed on the front side facing down.

When the recording material is conveyed through the two-side path 263 toward a paper re-feeding roller 264, a paper re-feeding sensor 265 immediately before the paper re-feeding roller 264 detects the passage. When the paper re-feeding sensor 265 detects the passage of the recording material, the conveyance operation is temporarily suspended in the present embodiment after a predetermined time. As a result, the recording material hits the terminated paper re-feeding roller 264, and the conveyance is temporarily terminated. The position is fixed so that the end in the travelling direction of the recording material is perpendicular to the conveyance path, and a skew, in which the conveyance direction of the recording material is displaced relative to the conveyance path in the paper re-feeding path, is corrected. Hereinafter, the process will be called a positional re-correction.

The positional re-correction is required to minimize the subsequent inclination in the image formation direction relative to the back side of the recording material. After the positional re-correction, the paper re-feeding roller 264 is activated to convey the recording material to the paper feeding path 266 again, with the front and the back reversed. The subsequent image forming operation is the same as the image formation operation of the front side, and the description will not be repeated. The discharge flapper 257 switches the conveyance path toward the discharge path 258 to discharge the recording material including the images formed on the front and back sides to the discharge tray 242.

Continuous feeding of the recording material is also possible during the two-side printing in the present image forming unit 300. However, since there is only one system in the apparatus for forming an image on the recording material or fixing the formed toner image, printing on the front side and printing on the back side cannot be performed at the same time. Therefore, in the two-side printing, the image forming unit 300 alternately forms the images on the recording material from the cassettes 240, 241, and the manual paper feed unit 253 and on the recording material that is reversed for the backside printing and that is fed again to the image forming unit.

Figure 2:
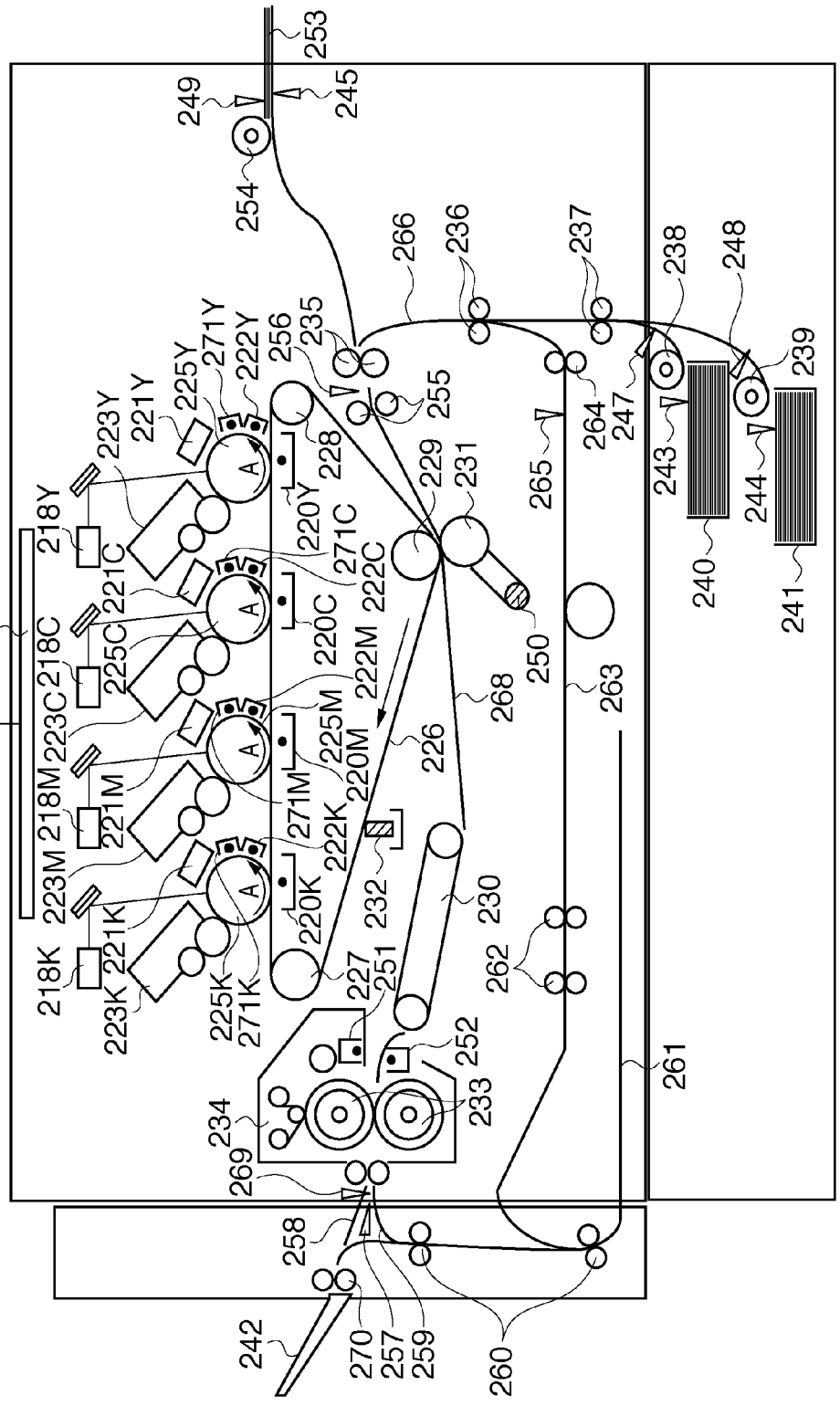
FIG. 2 is a cross-sectional view showing an example of configuration of an image forming unit 300 according to the present embodiment.

In the present image forming unit 300, the control loads shown in FIG. 2 are divided into four control blocks (a conveyance module A 280, a conveyance module B 281, an image forming module 282, and a fixing module 283) described later, and the control blocks are autonomously controlled. The image forming unit 300 further includes a master module 284 that manages the four control blocks to function as an image forming apparatus. Control configurations of the modules will be described below with reference to FIG. 3.

In the present embodiment, a master CPU (master control unit) 1001 included in the master module 284 controls the entire image forming apparatus 1000 based on an instruction and image data transmitted from the controller 460 through the printer control I/F 215. The conveyance module A 280, the conveyance module B 281, the image forming module 282, and the fixing module 283 for forming an image include sub-master CPUs (sub-master control units) 601, 901, 701, and 801 that control functions. The master CPU 1001 controls the sub-master CPUs 601, 901, 701, and 801. The functional modules further include slave CPUs (slave control units) 602, 603, 604, 605, 902, 903, 702, 703, 704, 705, 706, 802, and 803 for operating the control load for executing the functions. The sub-master CPU 601 controls the slave CPUs 602, 603, 604, and 605. The sub-master CPU 901 controls the slave CPUs 902 and 903. The sub-master CPU 701 controls the slave CPUs 702, 703, 704, 705, and 706. The sub-master CPU 801 controls the slave CPUs 802 and 803.

Figure 3:
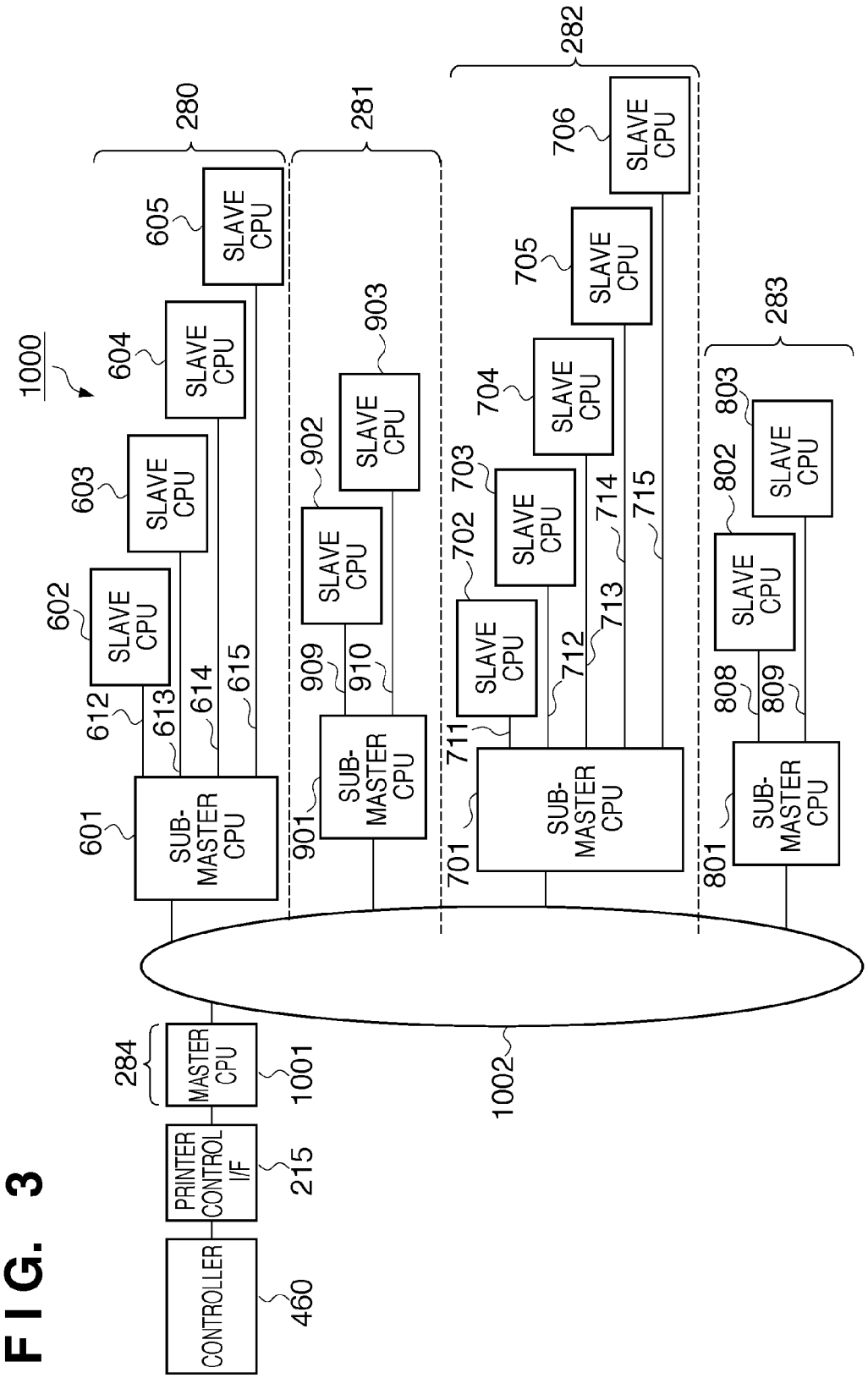
FIG. 3 is a diagram schematically showing a relationship between a master CPU, sub-master CPUs, and slave CPUs according to the present embodiment.

As shown in FIG. 3, the master CPU 1001 and the plurality of sub-master CPUs 601, 701, 801, and 901 are connected by a common network-type communication bus (first signal line) 1002. The sub-master CPUs 601, 701, 801, and 901 are also connected to each other by the network-type communication bus (first signal line) 1002. The master CPU 1001 and the plurality of sub-master CPUs 601, 701, 801, and 901 may be connected by a ring. The sub-master CPU 601 is further connected one to one (peer-to-peer connection) with the plurality of slave CPUs 602, 603, 605, and 605 through high-speed serial communication buses (second signal lines) 612, 613, 614, and 615, respectively. Similarly, the sub-master CPU 701 is connected to the slave CPUs 702, 703, 704, 705, and 706 through high-speed serial communication buses (second signal lines) 711, 712, 713, 714, and 715, respectively. The sub-master CPU 801 is connected to the slave CPUs 802 and 803 through high-speed serial communication buses (second signal lines) 808 and 809, respectively. The sub-master CPU 901 is connected to the slave CPUs 902 and 903 through high-speed serial communication buses (second signal lines) 909 and 910, respectively. The high-speed serial communication buses are used for short-distance high-speed communications.

In the image forming apparatus 1000 according to the present embodiment, functions are divided to realize the control requiring responsiveness dependent on the timing in functional modules controlled by the sub-master CPUs. Therefore, the high-speed serial communication buses with excellent responsiveness connect the communications between the slave CPUs and the sub-master CPUs for driving the control loads at terminals. More specifically, signal lines with higher timing accuracy of data transfer than that of the first signal line are used for the second signal lines.

Meanwhile, the sub-master CPUs 601, 701, 801, and 901 communicate with the master CPU 1001 to control a rough flow of a process of an image forming operation that does not require precise control timing. For example, the master CPU 1001 instructs the sub-master CPUs to start image formation pre-processing, paper feeding, or image formation post-processing. The master CPU 1001 also issues an instruction to the sub-master CPUs before the start of image formation based on a mode (such as a monochrome mode and a two-side image formation mode) instructed by the controller 460. Only communications that do not require precise timing are also performed between the sub-master CPUs 601, 701, 801, and 901. More specifically, a control of the image forming apparatus is divided into controls that do not mutually require precise timing control, and each sub-master CPU controls each control at a precise timing. As a result, the communication traffic is minimized in the present image forming apparatus 1000, and the connection by the low-speed, inexpensive network-type communication bus 1002 is possible. The control boards mounted on the master CPU, the sub-master CPUs, and the slave CPUs do not have to be uniform, and the control boards can be variably arranged in accordance with the situations in the apparatus implementation.

Figure 4:
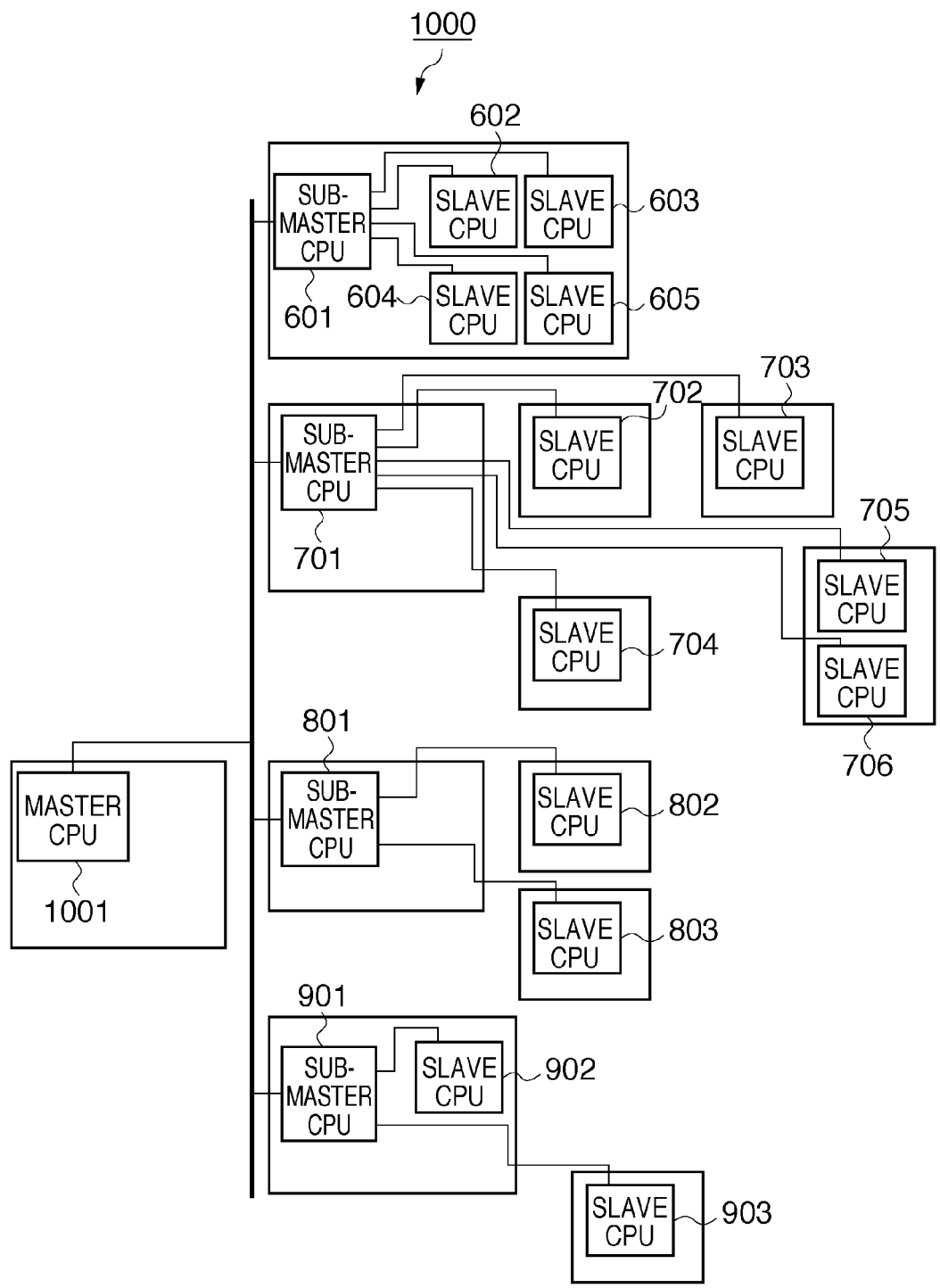
FIG. 4 is a diagram showing an example of a control board of the image forming apparatus 1000 according to the present embodiment.

Specific arrangements of board configurations of the master CPU, the sub-master CPUs, and the slave CPUs according to the present embodiment will be described with reference to FIG. 4. As shown in FIG. 4, various configurations of control boards can be adopted according to the present embodiment. For example, the sub-master CPU 601 and the slave CPUs 602, 603, 604, and 605 are mounted on the same board. The sub-master CPU and individual slave CPUs may be arranged as independent boards, such as the sub-master CPU 701 and the slave CPUs 702, 703, and 704, as well as the sub-master CPU 801 and the slave CPUs 802 and 803. Like the slave CPUs 705 and 706, some slave CPUs may be arranged on the same board. Like the sub-master CPU 901 and the slave CPU 902, only a sub-master CPU and some slave CPUs may be arranged on the same board.

<Configurations of Control Modules>

Figure 5:
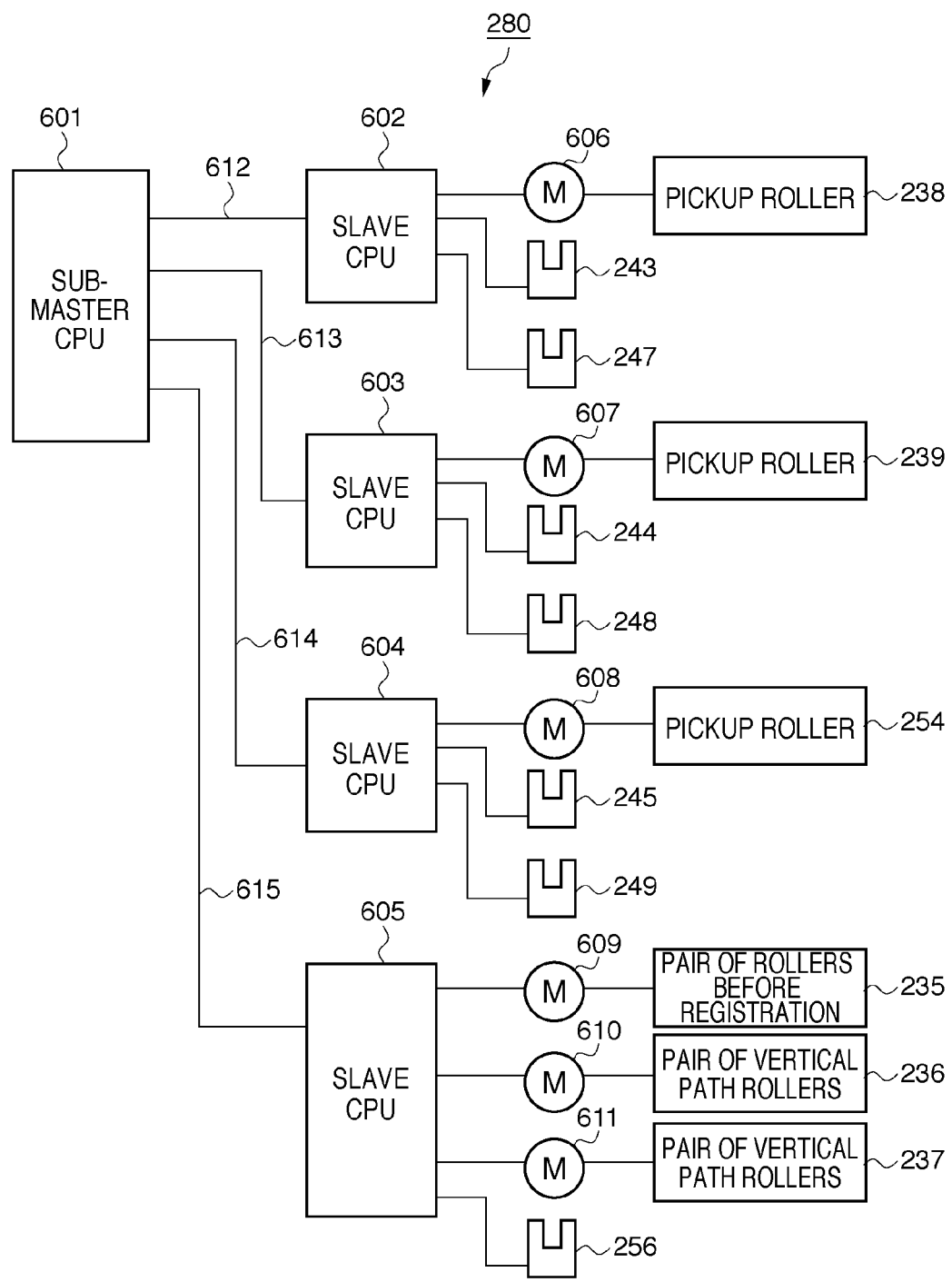
FIG. 5 is a diagram showing an example of configuration of a conveyance module A 280 according to the present embodiment.

Functions and configurations related to the control modules will be described in detail with reference to FIGS. 5 and 6. The conveyance module A 280 shown in FIG. 5 manages the paper feeding control (feeding function) until the recording material hits the nip portion of the registration roller 255 that has terminated the recording material stored in the cassettes 240, 241, and the manual paper feed unit 253. The conveyance module A 280 includes the sub-master CPU 601 that comprehensively controls the paper feeding control and the slave CPUs 602, 603, 604, and 605 that drive the control loads. A directly controlled control load group is connected to each slave CPU.

The slave CPU 602 handles, as control loads: a driving source motor 606 for driving the pickup roller 238; the no-sheet detection sensor 243; and the paper feeding sensor 247 that are related to the cassette 240, and performs control until the recording material is delivered to the paper feeding path 266. The slave CPU 603 handles, as control loads: a driving source motor 607 for driving the pickup roller 239; the no-sheet detection sensor 244; and the paper feeding sensor 248 that are related to the cassette 241, and performs control until the recording material is delivered to the paper feeding path 266. The slave CPU 604 handles, as control loads: a driving source motor 608 for driving the pickup roller 254; the no-sheet detection sensor 245; and the paper feeding sensor 249 that are related to the manual paper feed unit 253, and performs control until the recording material is delivered to the paper feeding path 266. The slave CPU 605 handles, as control loads: driving source motors 609, 610 and 611 for driving the pairs of paper feed rollers 235, 236, and 237; and the registration sensor 256. The slave CPU 605 controls the control loads and performs control until the recording material delivered from the cassettes 240, 241, and the manual paper feed unit 253 is conveyed to hit the nip portion of the registration roller 255 and temporarily terminated. In the present embodiment, the sub-master CPU 601 and the slave CPUs 602, 603, 604, and 605 are connected one to one through independent high-speed serial communication buses 612, 613, 614, and 615, respectively.

Figure 6:
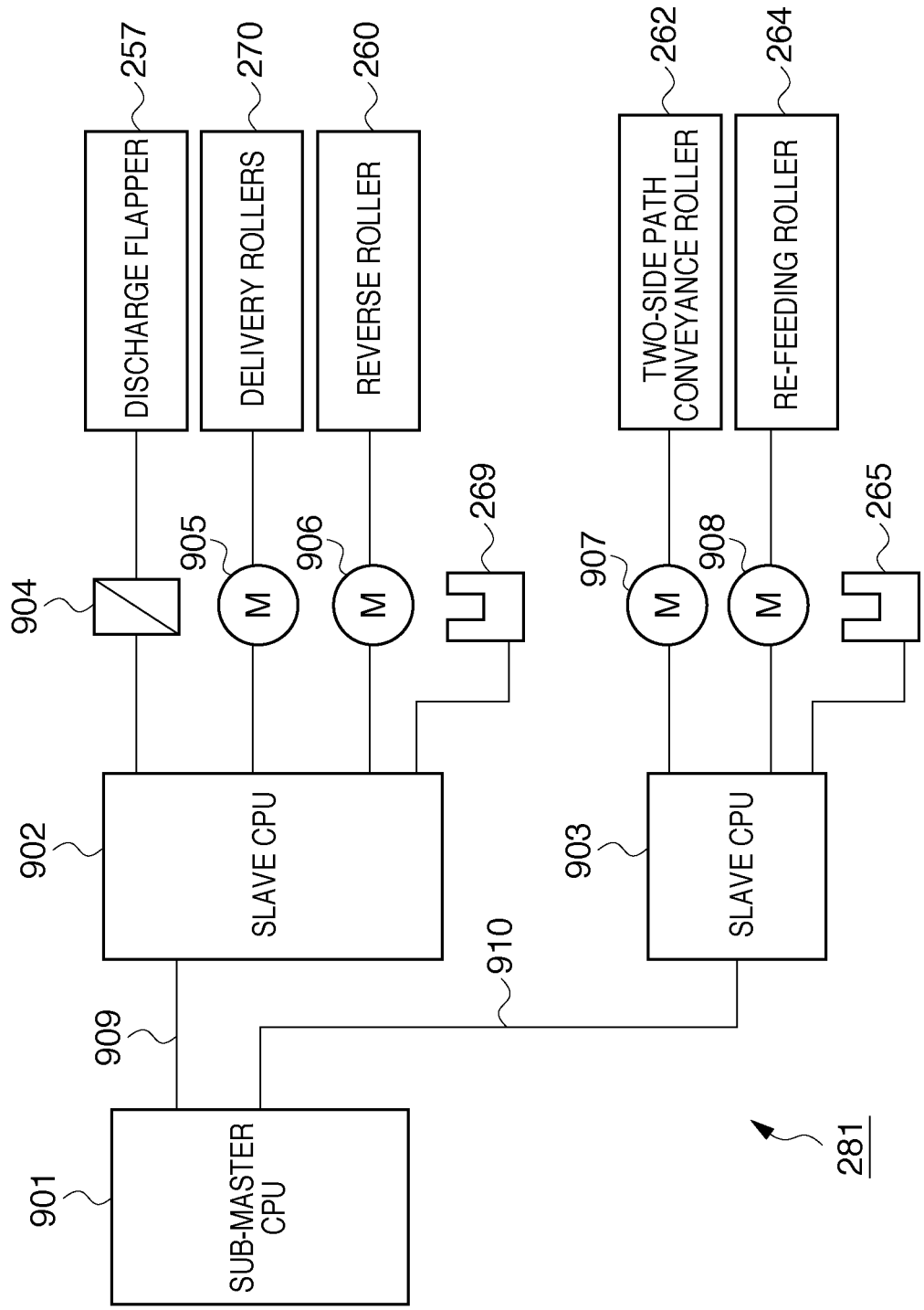
FIG. 6 is a diagram showing an example of configuration of a conveyance module B 281 according to the present embodiment.

The conveyance module B 281 shown in FIG. 6 manages discharge control (discharge function) for receiving the recording material including the image fixed by the fixing module 283 and discharging the recording material to the outside of the image forming unit 300 or manages backside reverse control (reverse function) for reversing the front and back of the recording material for backside printing and delivering the recording material again to the conveyance module A 280. The conveyance module B 281 includes the sub-master CPU 901 that comprehensively controls the discharge control and the backside reverse control and the slave CPUs 902 and 903 that drive the control loads. Directly controlled control load groups are connected to the slave CPUs.

The slave CPUs 902 handle a solenoid 904 that switches the discharge flapper 257, a driving source motor 905 that drives the discharge roller 270, a driving source motor 906 that drives the reverse roller 260, and the sensor 269 as control loads. The slave CPU 902 controls the control loads and performs control until the recording material is discharged from the conveyance path after fixation to the outside or until the recording material is delivered to the two-side reverse path 261. The slave CPU 903 handles a driving source motor 907 that drives the two-side path conveyance roller 262, a driving source motor 908 that drives the paper re-feeding roller 264, and the paper re-feeding sensor 265 as control loads. The slave CPU 903 controls the control loads and performs control until the recording material delivered from the reverse path is delivered again to the paper feeding path 266. In the present embodiment, the sub-master CPU 901 and the slave CPUs 902 and 903 are connected one to one through independent high-speed serial communication buses 909 and 910, respectively.

The image formation control to the recording material is realized by combining autonomous operations of the four modules in the present embodiment. However, the actual image forming operations are divided into several patterns in accordance with combinations of selection of paper feed stage/paper size, designation of one-side/two-side printing, designation of black-white printing/color printing, etc. The operator presets and inputs a specific instruction through the operation unit 10 or an external I/F 465. The overall control for comprehensively operating the modules is necessary to realize operations desired by the operator based on the instruction. In the present embodiment, the master CPU 1001 in the master module 284 comprehensively controls the sub-master CPUs 601, 701, 801, and 901. The major flow of the overall control by the master CPU 1001 is realized by exchanging commands through communications between the master CPU 1001 and the sub-master CPUs 601, 701, 801, and 901 through the low-speed network-type communication bus 1002. The overall control is further realized by exchanging commands through opposing communications between the sub-master CPUs 601, 701, 801, and 901 and the slave CPUs 602, 603, 604, 605, 702, 703, 704, 705, 706, 802, 803, 902, and 903 through the high-speed serial communication bus.

<Clock Correction Process>

Individual internal clock oscillators drive the CPUs in the present embodiment. The built-in clock oscillators operate at the same frequency of clock signal. However, an error occurs due to individual differences between the internal clock oscillators even if an attempt is made to operate the oscillators at the same operating frequency. As a result, when a plurality of CPUs individually control actuators, such as stepping motors, the error in the built-in clock oscillators causes an error in the speed between the stepping motors that control the conveyance of paper, and mutual pulling of paper, flexures, etc., occur. Particularly, when a plurality of slave CPUs rotate the motors to convey one piece of paper as in the present embodiment, flexures or buckling of paper may occur due to the speed difference. The mutual pulling of paper causes a loss of synchronism of motors, and the speed difference in the transfer units causes a defective image. The deviation in the built-in clock oscillators directly influences the control period or the control timing during the time measurement. This causes a paper jam or a defective image. Thus, the influence of the frequencies of the clock signals caused by inaccurate built-in clock oscillators with individual differences needs to be reduced, and a correction needs to be made to prevent the failures. Therefore, a clock correction process is executed in the present embodiment to reduce the control error caused by the error in the frequencies of the clock signals that drive the CPUs.

<Example of Connection Between Sub-Master CPU and Slave CPU>

Figure 7:
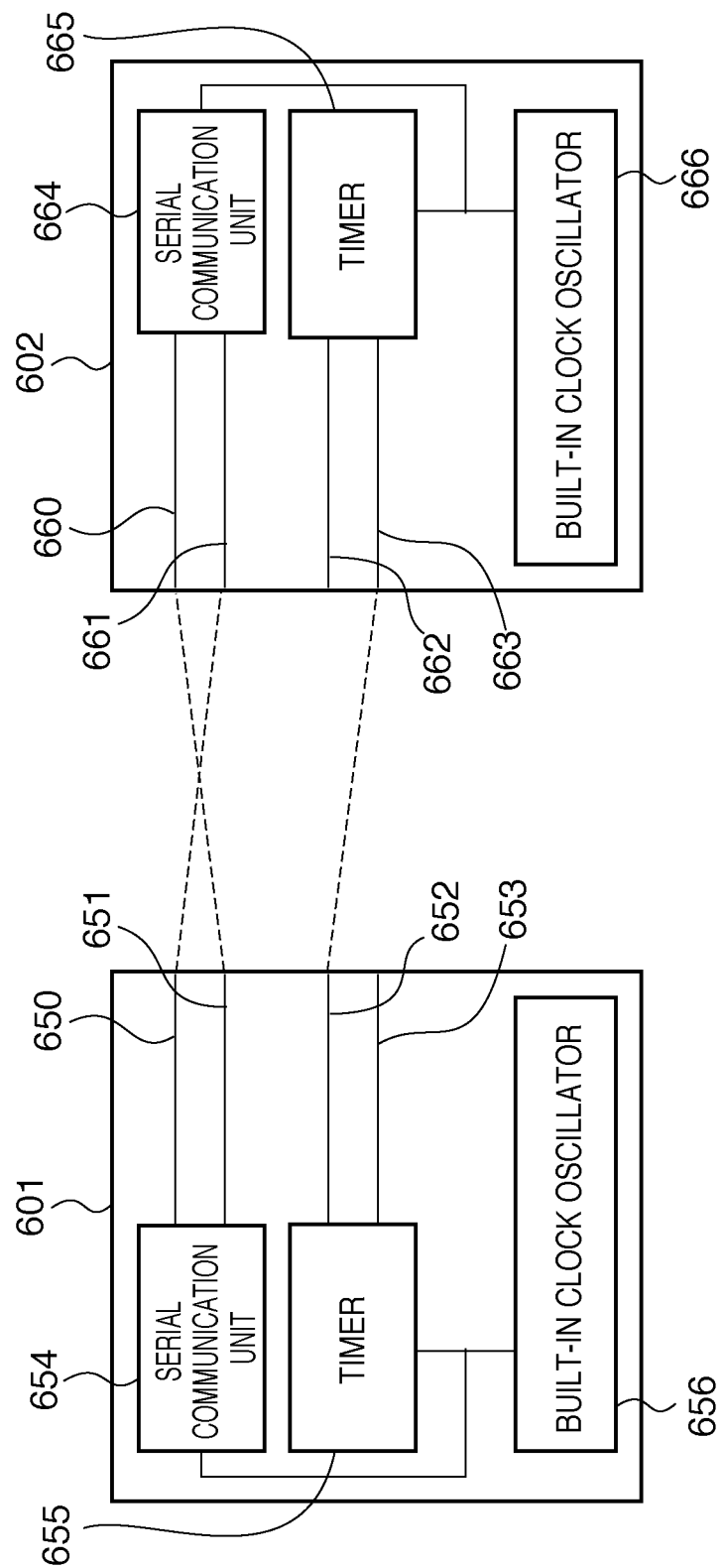
FIG. 7 is a diagram showing an example of connection between the sub-master CPU and the slave CPU according to the present embodiment.

The connection between the sub-master CPU and the slave CPU will be described first with reference to FIG. 7. FIG. 7 shows an example of the connection between the sub-master CPU 601 and the slave CPU 602. An example of applying the present invention between the sub-master CPU (upper layer control unit) and the slave CPU (lower layer control unit) will be described. However, the controls of the control units described below may be opposite in the present invention, and the present invention can also be applied to between the sub-master CPUs and between the slave CPUs. Therefore, the present invention can be applied between the first control unit and the second control unit. Thus, the present invention is designed to reduce the influence of the control error between a plurality of control units.

The sub-master CPU 601 is operated based on a built-in clock oscillator (first clock oscillator) 656. A timer 655 and a serial communication unit 654 are also operated based on the clock of the built-in clock oscillator 656. The serial communication unit 654 uses a transmission pin 650 and a reception pin 651 to communication with the outside. The timer 655 includes a compare match output pin 652 and an input capture input pin 653. The timer 655 counts the clock of the built-in clock oscillator 656, and the sub-master CPU 601 resets the count value.

The slave CPU 602 is operated based on a built-in clock oscillator (second clock oscillator) 666. The clock is supplied to a timer 665 and a serial communication unit 664. The serial communication unit 664 includes a transmission pin 660 and a reception pin 661 which are connected to the reception pin 651 and the transmission pin 650 of the sub-master CPU 601 through a cable. The timer 665 includes a compare match output pin 662 and an input capture input pin 663. The timer 665 counts the clock of the built-in clock oscillator 666, and the slave CPU 602 resets the count value. Therefore, according to the present embodiment, the serial communication unit 654 of the sub-master CPU 601 functions as a start notification unit, and the serial communication unit 664 of the slave CPU 602 functions as a start response unit.

The timer 665 includes the compare match output pin 652 and the input capture input pin 663. As shown in FIG. 7, the input capture input pin 663 is connected to the compare match output pin 652 of the sub-master CPU 601 through a dedicated signal line for transmitting a pulse signal. Therefore, according to the present embodiment, the compare match output pin 652 of the sub-master CPU 601 functions as a signal transmitting unit, and the input capture input pin 663 of the slave CPU 602 functions as a signal receiving unit.

<Compare Match Output>

Figure 8:
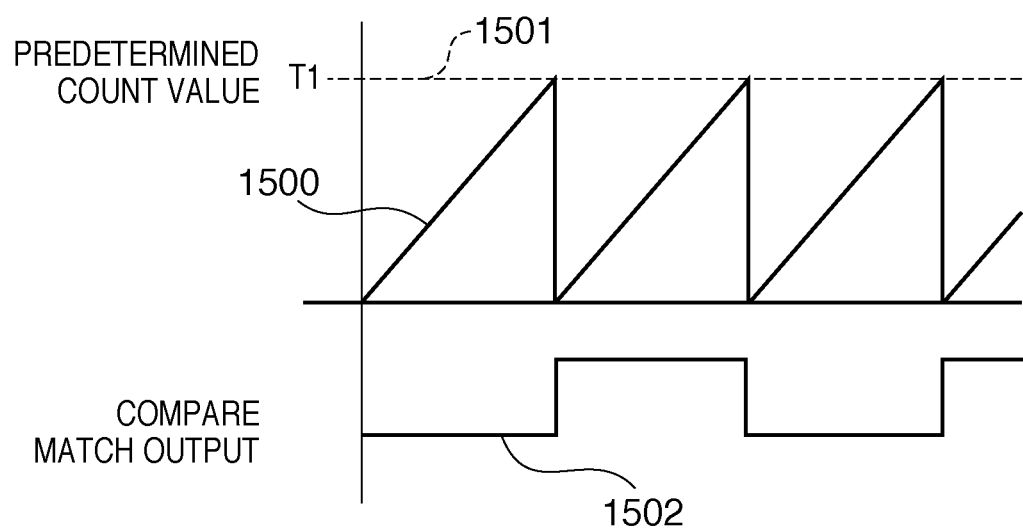
FIG. 8 is a diagram showing an example of a compare match output according to the present embodiment.

A compare match output using a timer function of the sub-master CPU 601 will be described with reference to FIGS. 8 and 9. The compare match output denotes an operation of generating a pulse signal according to a predetermined clock rate for the sub-master CPU 601 to apply a clock correction process to the slave CPU 602 and of outputting the pulse signal through the dedicated signal line. FIG. 8 shows a schematic diagram of a timer counter. Reference numeral 1500 denotes a timer count value. Reference numeral 1502 denotes a signal outputted to the compare match output pin 652, and interrupt signals are generated for the sub-master CPU 601 at rising and trailing edges. When the timer function is activated, the timer 655 is configured to continue counting up the value up to a predetermined count value T1 (1501) and start interrupt processing when the value reaches the count value T1 (1501). Reference numeral 1502 of FIG. 8 denotes a compare match output corresponding to the timer count value.

Figure 9:
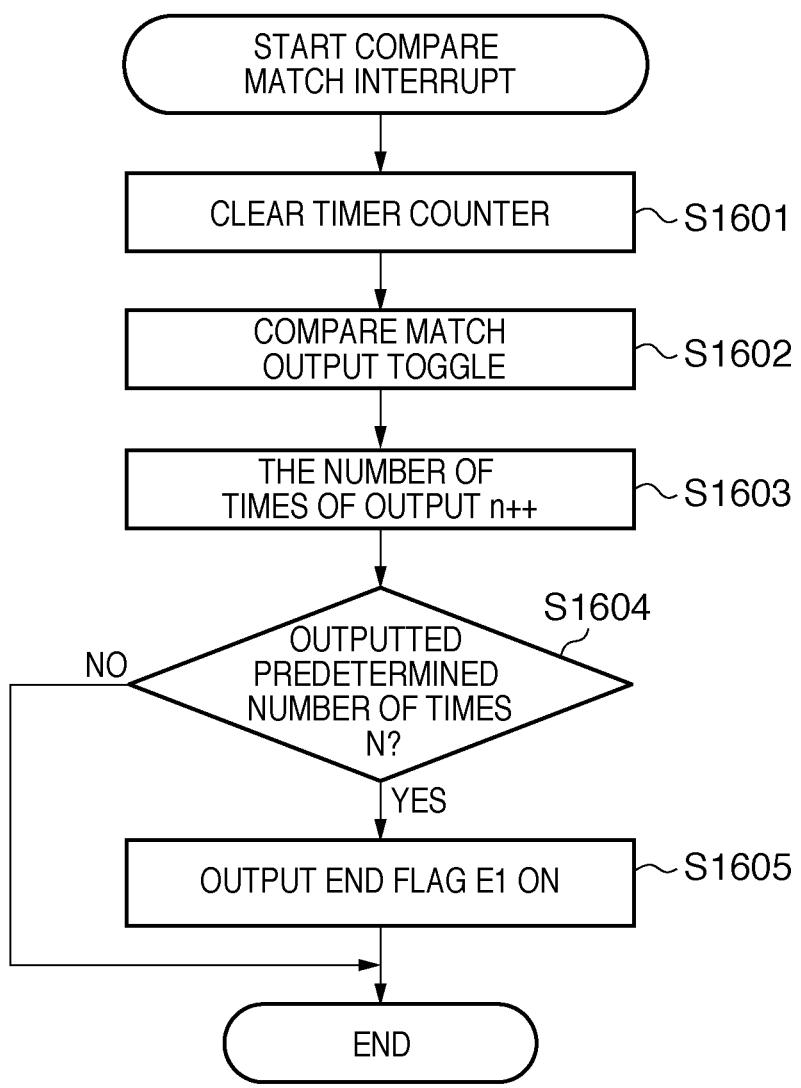
FIG. 9 is a flow chart showing a control procedure of the compare match output according to the present embodiment.

FIG. 9 shows a control flow of the interrupt processing executed when the timer count value reaches the predetermined count value T1. The sub-master CPU 601 comprehensively controls the interrupt processing.

When the interrupt processing starts, the sub-master CPU 601 clears the timer count in S1601 and carries out toggle output to the compare match output pin 652 in S1602. Therefore, the timer count value is reset every time the timer count value reaches T1, and the compare match output is reversed. In S1603, the sub-master CPU 601 determines whether the toggle output is carried out for a predetermined number of times of output N equivalent to a predetermined clock rate. If the output is carried out, an output end flag E1 is set to ON in S1605, and the process ends. Meanwhile, if the predetermined number of times N of output is not finished, the process ends. In this way, the sub-master CPU 601 generates, using the timer 655 driven by the built-in clock oscillator 656, a pulse signal corresponding to the predetermined clock rate and outputs the pulse signal to the slave CPU 602 through the dedicated signal line.

As described, the timer count and the interrupt are used in the present embodiment to realize the output of the compare match output 1502 shown in FIG. 8. To further improve the output accuracy, a highly functional timer of the CPU may be used, without using the interrupt processing, to realize the toggle output from the compare match output pin.

<Input Capture Input>

Figure 10:
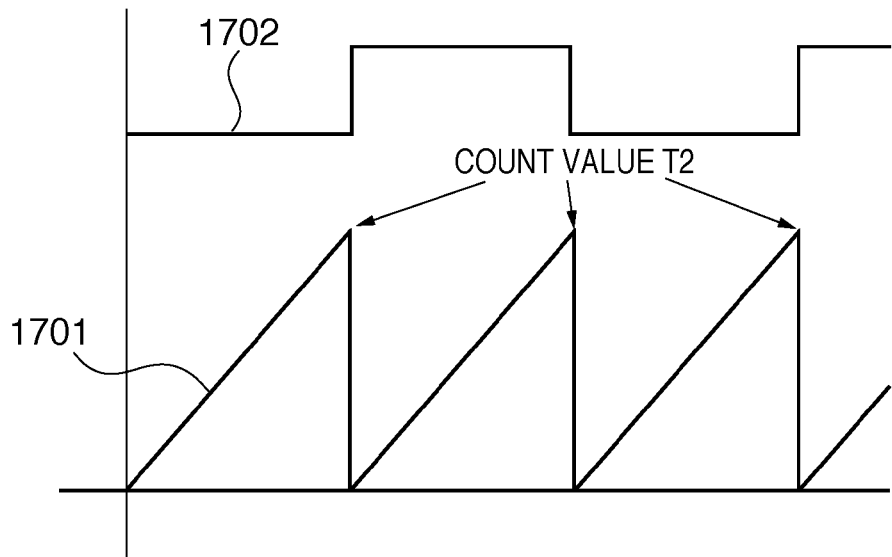
FIG. 10 is a diagram showing an example of an input capture input according to the present embodiment.

An input capture input using a timer function of the slave CPU 602 will be described with reference to FIGS. 10 and 11. The input capture input denotes an operation by the slave CPU 602 receiving the pulse signal outputted in the compare match output through the dedicated signal line. FIG. 10 shows a schematic diagram of timer count. Reference numeral 1701 denotes a timer count value. Reference numeral 1702 denotes a signal inputted to the input capture input pin 663, and interrupt signals are generated for the slave CPU 602 at rising edges and trailing edges.

As shown in FIG. 7, the input capture input pin 663 is connected to the compare match output pin 652 of the target sub-master CPU 601. FIG. 11 shows a control flow of the interrupt processing executed when there are rising edges and trailing edges in the input capture input signal 1702. The slave CPU 602 comprehensively controls the interrupt processing.

When the interrupt processing starts, the slave CPU 602 reads out a count value T2 of the timer 665 in S1801 and clears the timer counter in S1802. In S1803, the slave CPU 602 determines whether the edges are inputted to the input capture input signal for the predetermined number of times N, and the process proceeds to S1804 if the edges are inputted for more than the predetermined number of times N. An input end flag E2 is set to ON, and the process ends. Meanwhile, if there is less than the predetermined number of times N of input, the process ends. Based on the process, the slave CPU 602 measures, using the timer 665 driven by the built-in clock oscillator 666, the pulse width of the pulse signal (compare match output) outputted from the sub-master CPU 601. The pulse width is equivalent to the signal width of a plurality of clock signals outputted by the built-in clock oscillator.

In this way, the timer count and the interrupt are used in the present embodiment to measure the pulse width of the input capture input signal 1702 shown in FIG. 10. To further improve the measurement accuracy, a highly functional timer of the CPU may be used, without using the interrupt processing, to automatically measure the pulse width.

<Correction Procedure>

Figure 12:
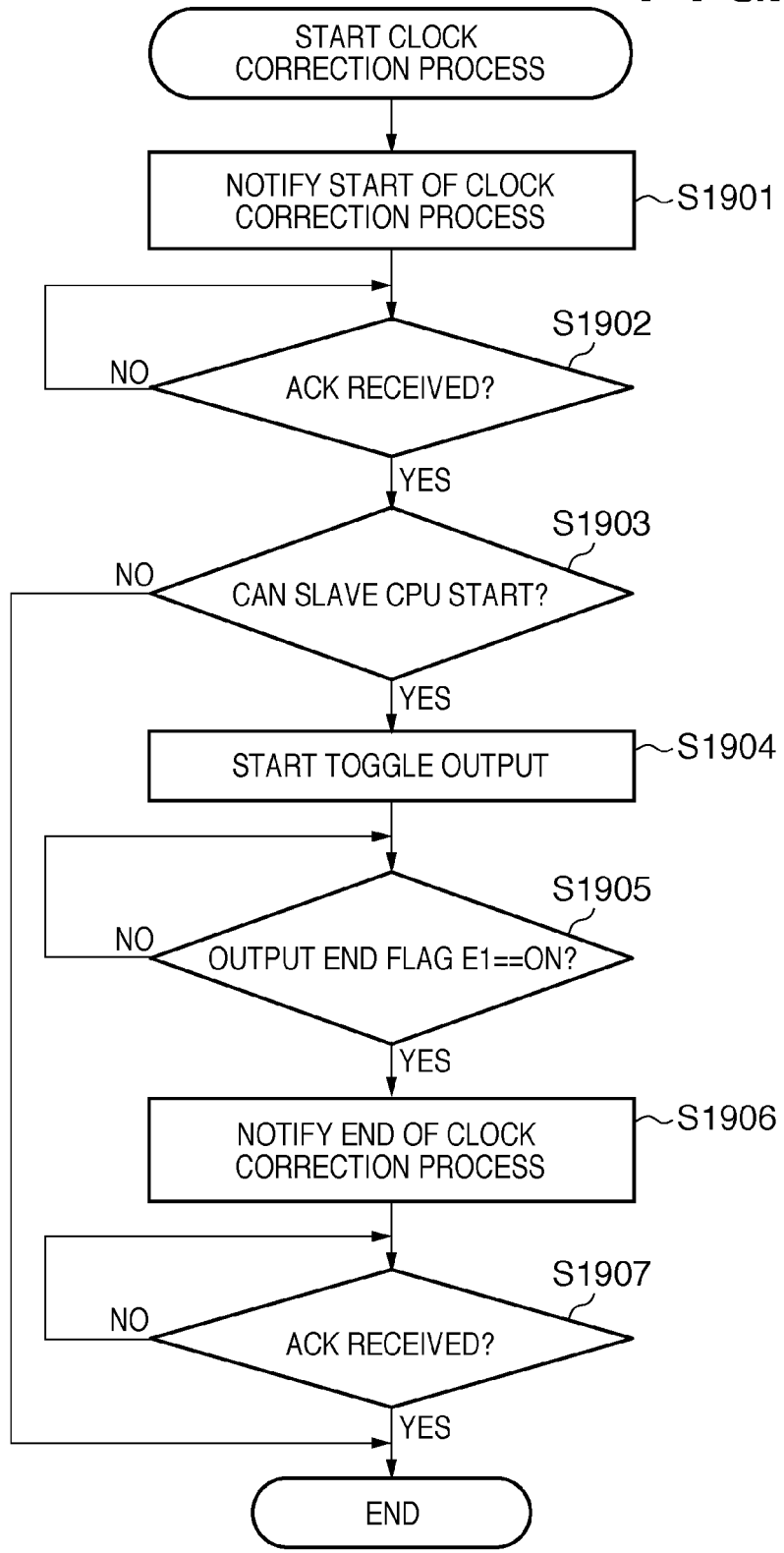
FIG. 12 is a flow chart showing a control procedure of a clock correction process of an upper layer CPU according to the present embodiment.

A control procedure of a clock correction process in the sub-master CPU 601 will be described with reference to FIG. 12. A clock correction process between the sub-master CPU 601 and the slave CPU 602 will be described as an example. When the clock correction process is started, the sub-master CPU 601 notifies the slave CPU 602 of the start of the clock correction process in S1901. Table 1 shows the content of notification.

TABLE 1

| Content of Notification | |
|---|---|
| CPU Operating Frequency | 20 MHz |
| Timer Operating Frequency | 20 MHz |
| Counter Period | 1/1φ |
| Reference Pulse Width | 0 × FF00 |
| The Number of Times of Measurement | 10 |

The CPU operating frequency denotes an operating frequency of the sub-master CPU 601. The timer operating frequency denotes an operating frequency of the timer function included in the sub-master CPU 601. The reason that the information of the timer operating frequency is included in the content of notification is that there is a case in which the operating frequency of the sub-master CPU 601 and the operating frequency of the timer as a peripheral circuit are different. The counter period is a value for determining the frequency for counting up the timer counter by 1. The reference pulse width denotes a toggle width of the compare match output waveform. The reference pulse width denotes a signal width of the clock signal that is outputted from the built-in clock oscillator and that is equivalent to the predetermined clock rate. In the present embodiment, the operating frequency of the sub-master CPU 601 and the timer operating frequency are both 20 MHz, the counter period is 1/1φ (i.e. 20 MHz), the reference pulse width is 0xFF, and the number of times of measurement is 10 times.

In S1902, the sub-master CPU 601 determines whether ACK is received from the slave CPU 602. The process proceeds to S1903 if the ACK is received, and the sub-master CPU 601 determines whether the slave CPU 602 can start the clock correction process based on the content of the ACK. The process ends if the slave CPU 602 notifies the sub-master CPU 601 that the clock correction process cannot be started.

Figure 14:
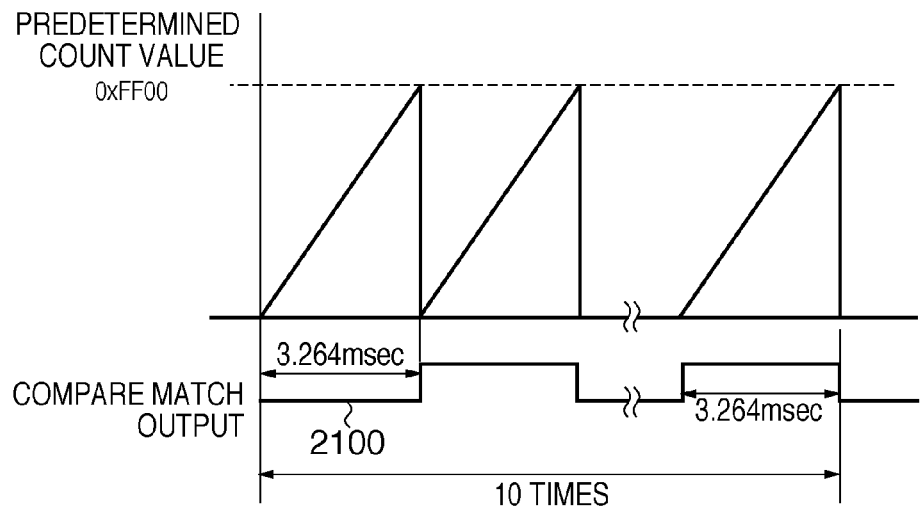
FIG. 14 is a diagram showing an example of a compare match output according to the present embodiment.

On the other hand, the process proceeds to S1904 if the slave CPU 602 notifies the sub-master CPU 601 that the clock correction process can be started. The sub-master CPU 601 starts the toggle output to the compare match output pin 652. Therefore, in the present embodiment, a toggle waveform with a 3.264 msec period is outputted as a compare match output waveform 2100 as shown in FIG. 14. In S1905, the sub-master CPU 601 determines whether the output end flag E1 is set to ON. The process proceeds to S1906 if the output end flag E1 is set to ON, and the sub-master CPU 601 notifies the slave CPU 602 of the finish of the clock correction process. In S1907, the sub-master CPU 601 waits for the ACK to end the process. On the other hand, if the output end flag E1 is not set to ON in S1905, the determination of S1905 is periodically repeated until the output end flag E1 is set to ON.

Figure 13:
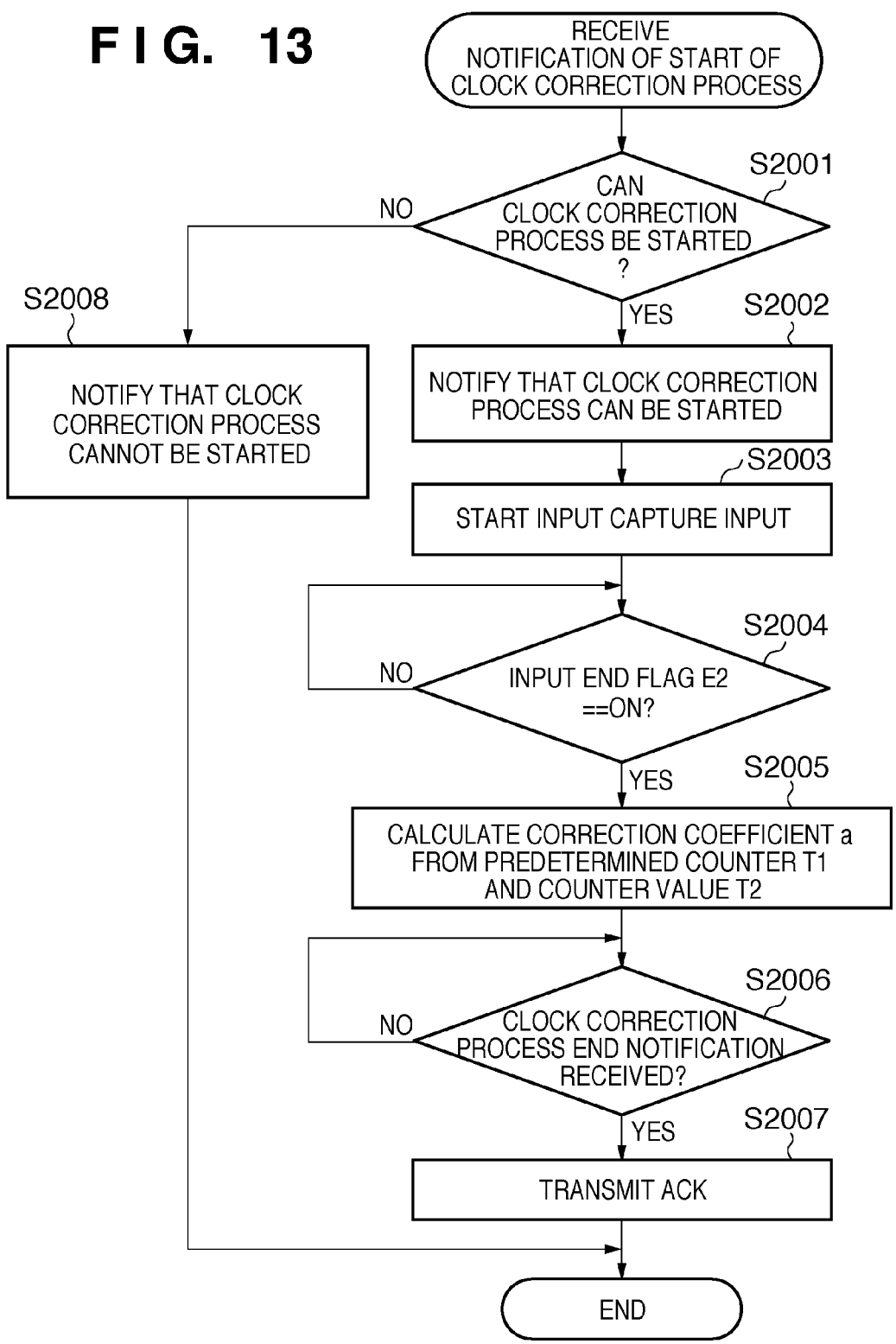
FIG. 13 is a flow chart showing a control procedure of a clock correction process of a lower layer CPU according to the present embodiment.

A control procedure of the clock correction process in the slave CPU 602 will be described with reference to FIG. 13. A process of the slave CPU 602 corresponding to the process of the sub-master CPU 601 of FIG. 12 will be described here. When the notification of the start of the clock correction process is received from the sub-master CPU 601, the slave CPU 602 determines in S2001 whether the clock correction process can be started. The process proceeds to S2008 if the clock correction process cannot be started. The slave CPU 602 notifies the sub-master CPU 601 that the clock correction process cannot be started, and the process ends. An example of the state in which the clock correction process cannot be started includes a case in which the timer resource for input capture input waveform measurement is used in another operation.

On the other hand, the process proceeds to S2002 if the clock correction process can be started. The slave CPU 602 notifies the sub-master CPU 601 that the clock correction process can be started and transmits the ACK to the sub-master CPU 601, and the process proceeds to S2003. In S2003, the slave CPU 602 starts the input capture input. In S2004, the slave CPU 602 determines whether the input end flag E2 is set to ON and periodically repeats the determination of S2004 if the input end flag E2 is OFF. On the other hand, the process proceeds to S2005 if the input end flag E2 is ON, and the slave CPU 602 calculates a correction coefficient α. The correction coefficient α is calculated as follows.

Correction coefficient α=reference pulse width/count value T2

More specifically, the correction coefficient α is delivered by dividing the pulse width of the pulse signal outputted from the sub-master CPU 601 (i.e. equivalent to the signal width in the clock signal at the predetermined clock rate) by the pulse width measured by the slave CPU 602. The correction coefficient α is calculated for each measurement, and the final correction coefficient α is calculated by averaging the measurements. In the present embodiment, the correction coefficient α is calculated as follows.

Correction coefficient α=0xFF00(65280 dec)/count value T2

Therefore, if the count value T2 is 62016, the correction coefficient α is 1.05.

This denotes that the speed of the built-in clock oscillator of the sub-master CPU 601 is 105% of the speed of the built-in clock oscillator of the slave CPU. In other words, the slave CPU 602 is 5% slower than the sub-master CPU 601. Thus, the substantial operating frequency of the slave CPU 602 is 20 MHz×0.95=19 MHz.

Therefore, when the timer is used in the measurement of the speed of the motor drive or in the measurement of time, the slave CPU 602 can use α value multiplied by the correction coefficient α to correct an error in speed or an error in control caused by an error in the built-in clock oscillators. After the calculation of the correction coefficient α, the slave CPU 602 waits for the notification of the end of the clock correction process in S2006, and the process proceeds to S2008 when the notification is received. The slave CPU 602 returns the ACK to the sub-master CPU 601 to end the process.

After execution of the clock correction process between each sub-master CPU and each slave CPU, variations in the built-in clock oscillators of the slave CPUs all conform to the built-in clock oscillator of the sub-master CPU as a control source. Therefore, the error in the speed between the stepping motors that control the conveyance of paper between the slave CPUs can be corrected.

Figure 15:
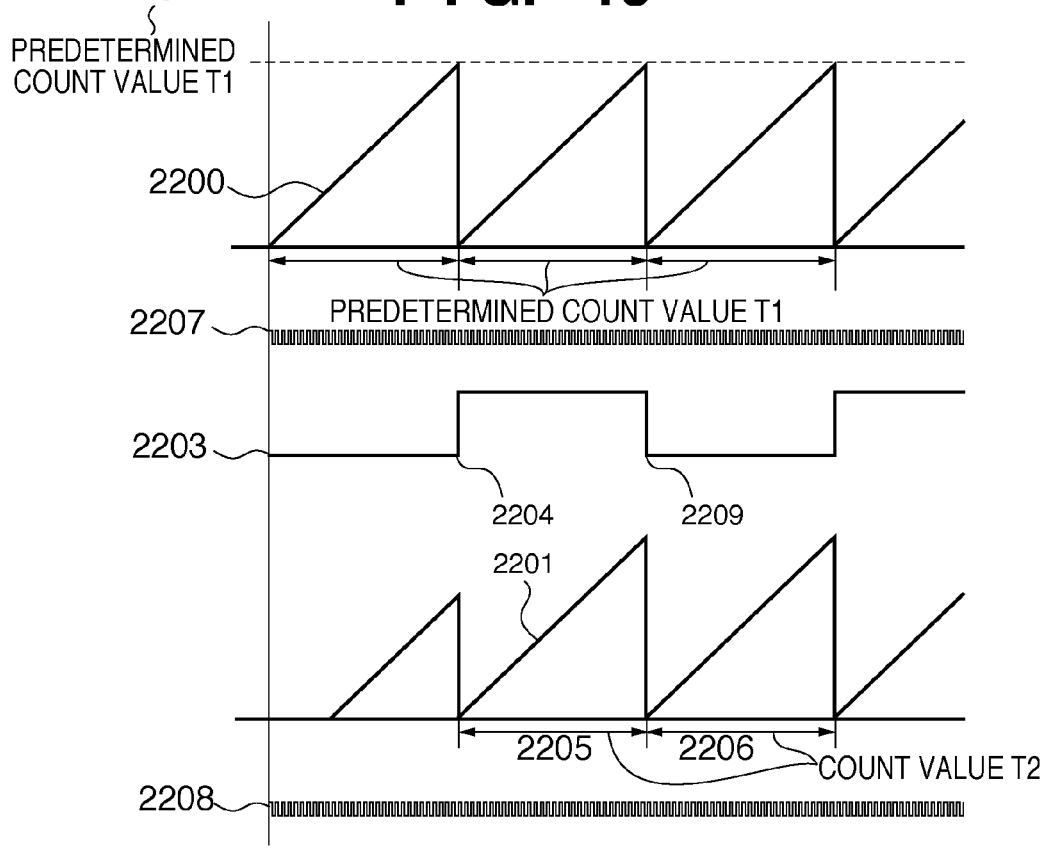
FIG. 15 is an operational outline of the CPUs according to the present embodiment.

An operational outline in the present embodiment will be described with reference to FIG. 15. When the toggle output is started in S1904, the timer of the sub-master CPU 601 starts counting as shown by reference numeral 2200. Since the period of counting is 1/1φ, the timer counts up by one for every one clock of an operational clock 2207 of the sub-master CPU 601. Since the operating frequency of the sub-master CPU 601 is 20 MHz in the present embodiment, one clock is 50 nsec. When the count value 2200 reaches a predetermined count value T1 (2202) (0xFF00 count in the present embodiment), an interrupt is generated in the sub-master CPU 601. The flow chart of FIG. 9 is executed, and a toggle output 2203 is outputted.

Figure 11:
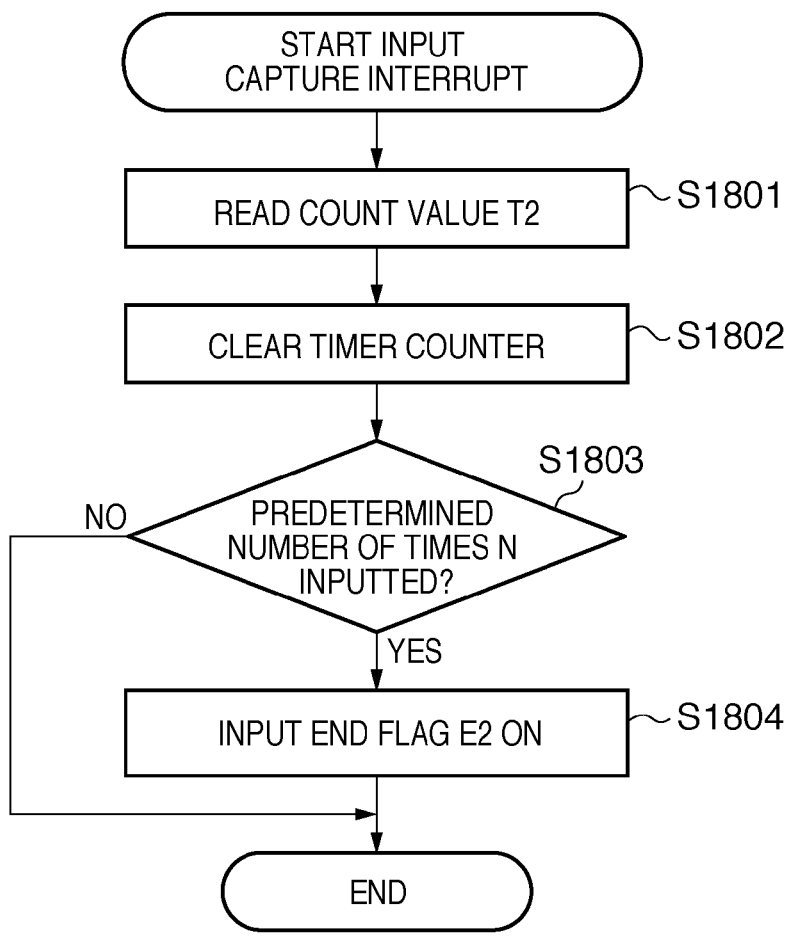
FIG. 11 is a flow chart showing a control procedure of the input capture input according to the present embodiment.

When an edge 2204 of the toggle output 2203 is detected, the slave CPU 602 starts the interrupt processing shown in FIG. 11. The timer count of S2003 is operated in a free run mode before the edge 2204 of the toggle output. The count-up of the slave CPU 602 is operated by an operating frequency 2208 of the slave CPU 602.

When an edge 2209 of the toggle output 2203 is generated, the slave CPU 602 similarly executes the interrupt processing shown in FIG. 11. This realizes measurement of a count value T2 of periods 2205 and 2206. When the measurement of the count value T2 is finished, the slave CPU 602 uses the reference pulse width (0xFF00 here) notified in advance from the sub-master CPU 601 to calculate the correction coefficient α of the operating frequency of the slave CPU 602.

<Example of Application of Correction Efficient α>

An application method of the correction coefficient α will be described. It is assumed here that the correction coefficient α of the slave CPU 602 is 1.05. A method of applying the correction coefficient α to the control of the rotation speed of the motor will be described first. The final speed of the motor rotated by the slave CPU 602 is calculated as follows.

Final motor speed=target motor speed×correction coefficient α

More specifically, when an instruction for rotation at 200 mm/sec is notified from the sub-master CPU 601, the slave CPU 602 performs control for rotation at 210 mm/sec so that the speed becomes the same as 200 mm/sec requested by the sub-master CPU.

A method of applying the correction coefficient α to the control of time measurement using the timer, etc., will be described. The final time measured by the slave CPU 602 is calculated as follows.

Final time=target time×(1−(correction coefficient α−1))

More specifically, in the measurement of 100 msec, the slave CPU 602 actually measures 95 msec to obtain the same result as the time measurement of 100 msec by the sub-master CPU 601.

As described, the image forming apparatus according to the present embodiment includes a first control unit and a second control unit driven by built-in clock oscillators to realize the distributed control. The first control unit generates, using a timer driven by the built-in clock oscillator of the first control unit, a pulse signal corresponding to a predetermined clock rate and outputs the pulse signal to the second control unit. The second control unit measures, using a timer driven by the built-in clock oscillator of the second control unit, a pulse width of the pulse signal outputted from the first control unit, and calculates a correction coefficient using a pulse width equivalent to the predetermined clock rate and the measured pulse width. The second control unit controls a load to be controlled using the calculated correction coefficient to. As a result, the image forming apparatus according to the present embodiment can realize the distributed control system by the plurality of control units and can reduce the control error caused by the individual differences between the frequencies of the clock signals in the control units with a simple configuration.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-058298 filed on Mar. 15, 2010, which is hereby incorporated by reference herein in its entirety.

What is claimed is:

1. An image forming apparatus comprising:
a first control unit driven by a first clock oscillator; and
a second control unit driven by a second clock oscillator,
said first control unit comprising a signal transmitting unit that generates, using a first timer driven by the first clock oscillator, a pulse signal in accordance with a predetermined clock rate, and that transmits the generated pulse signal to said second control unit, and a start notification unit that notifies said second control unit of a start of a clock correction process for calculating the correction coefficient,
said second control unit comprising:
a signal receiving unit that receives the pulse signal transmitted by said signal transmitting unit;
a measurement unit that measures, using a second timer driven by the second clock oscillator, a pulse width of the pulse signal received by said signal receiving unit;
a calculation unit that calculates a correction coefficient using a reference pulse width corresponding to the predetermined clock rate and the measurement pulse width;
an execution unit that executes image formation using the calculated correction coefficient; and
a start response unit that transmits information indicating whether the clock correction process can be started to said first control unit in response to receiving the start notification,
wherein said signal transmitting unit transmits the generated pulse signal to said second control unit in response to receiving the information transmitted from said second control unit, the information indicating that the clock correction process can be started.

2. The image forming apparatus according to claim 1, wherein said start response unit
transmits information indicating that the clock correction process cannot be started to said first control unit when the second timer is used in another process and
transmits information indicating that the clock correction process can be started to said first control unit when the second timer used is not used in the another process.

3. The image forming apparatus according to claim 1, wherein said signal transmitting unit and said signal receiving unit are connected by a dedicated signal line.

4. The image forming apparatus according to claim 1, wherein said calculation unit calculates the correction coefficient by dividing the reference pulse width by the measurement pulse width.

5. The image forming apparatus according to claim 4, wherein said execution unit controls a rotation speed of motor that drives a conveyance roller for conveying a recording material based on a target motor speed and the correction coefficient.

6. The image forming apparatus according to claim 4, wherein said execution unit controls a time measurement based on a target time and the correction coefficient.

7. The image forming apparatus according to claim 1, wherein
said first control unit is an upper layer control unit, and
said second control unit is a lower layer control unit that is controlled by said upper layer control unit and that controls a device.

8. The image forming apparatus according to claim 1, wherein said first clock oscillator is built in said first control unit, and said second clock oscillator is built in said second control unit.

9. A control apparatus comprising:
a first control unit driven by a first clock oscillator; and
a second control unit driven by a second clock oscillator,
said first control unit comprising a signal transmitting unit that generates, using a first timer driven by the first clock oscillator, a pulse signal in accordance with a predetermined clock rate, and that transmits the generated pulse signal to said second control unit, and a start notification unit that notifies said second control unit of a start of a clock correction process for calculating the correction coefficient,
said second control unit comprising:
a signal receiving unit that receives the pulse signal transmitted by said signal transmitting unit;
a measurement unit that measures, using a second timer driven by the second clock oscillator, a pulse width of the pulse signal received by said signal receiving unit;
a calculation unit that calculates a correction coefficient using a reference pulse width corresponding to the predetermined clock rate and the measurement pulse width; and
an execution unit that executes image formation using the calculated correction coefficient, and a start response unit that transmits information indicating whether the clock correction process can be started to said first control unit in response to receiving the start notification, wherein said signal transmitting unit transmits the generated pulse signal to said second control unit in response to receiving the information transmitted from said second control unit, the information indicating that that clock correction process can be started.

* * * * *